United States Patent [19]

Hooker

[11] 4,338,827

[45] Jul. 13, 1982

[54] FLOATING MARINE WINCH HANDLE

[76] Inventor: Rachael Hooker, 1312 N. Harper, W. Hollywood, Calif. 90046

[21] Appl. No.: 899,359

[22] Filed: Apr. 24, 1978

[51] Int. Cl.$^3$ .......................... G05G 1/00; B62D 1/06

[52] U.S. Cl. .......................................... 74/545; 74/557

[58] Field of Search ................. 74/543, 544, 546, 547, 74/548, 550, 551, 552, 553, 555, 556, 557, 545

[56] References Cited

U.S. PATENT DOCUMENTS 1,235,647 8/1917 Boheck ............................ 74/545 X 2,812,682 11/1957 Longone et al. ................. 74/545 X 3,406,590 10/1968 Popeil .................................. 74/545

*Primary Examiner*—Daniel J. O'Connor

[57] ABSTRACT

A floatable marine winch handle is disclosed that is suitable for use on sailing vessels incorporating the utilization of manual sailboat winches required for the raising of heavy cloth sails. The floating marine winch handle is comprised of a hollowed tubular design which is rigid enough to withstand the necessary stress requirement and is of light weight which enables it to displace its weight in water thereby rendering the winch handle retrievable when accidently dropped overboard from a vessel.

1 Claim, 1 Drawing Figure

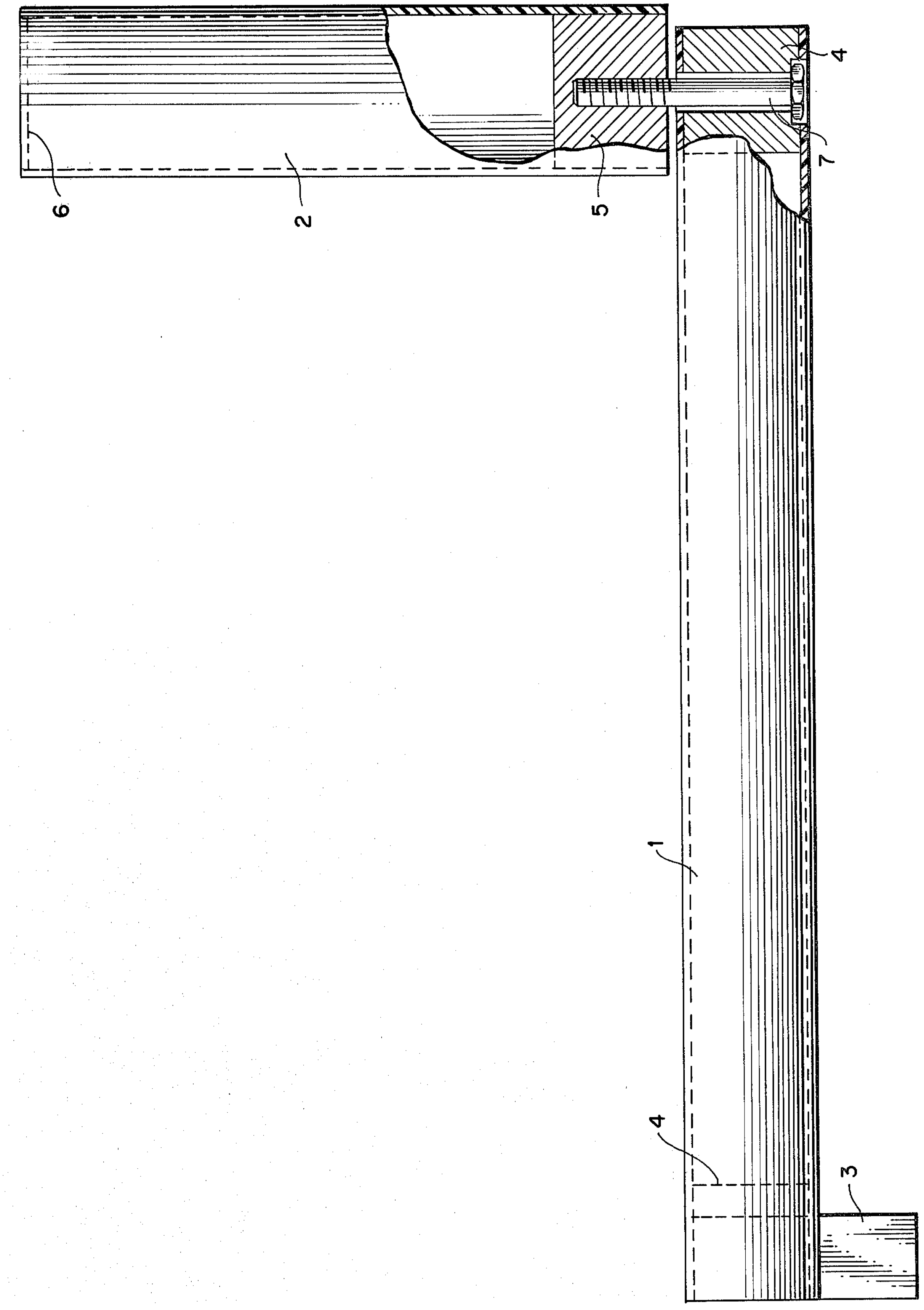
4
7
6
2
5
1
4
3

FLOATING MARINE WINCH HANDLE

SUMMARY OF THE INVENTION

It is the object of this invention to provide a floatable, light weight marine winch handle that is utilized with sailboat winches for the raising of heavy cloth sails Steel winch handles of the prior art weigh approximately two and-a-half to five pounds each. The floatable winch handle weighs less than one-half pound in total weight creating a substantial weight reduction. The handle is inserted into the various deck attached winches to provide a manual lever with the incorporation of rope lines to exert the necessary force required for raising sails. The handles of the prior art are manufactured from steel and are known for their heaviness. Although they are durable the weight is excessive and they are permenately lost when accidently dropped overboard. Replacement of these steel handles is at a considerable expense to the boat owner. The floatable winch handle is durable and capable of withstanding heavy use but because it displaces its weight in water it is retrievable when lost overboard thereby saving the high cost of replacement. Each vessel carries on board from four to eight of these handles depending on her size and amount of sail carried while racing or cruising. In the sport of sailing it is the reduction of total craft weight that increases speed and this fact is of the utmost importance to the designer and builder of sailing craft.

BRIEF DESCRIPTION OF THE DRAWING

The drawing is three dimensional showing a main view which depicts and identifies the following items: item No. (1) body, item No. (2) grip, item No. (3) socket head, item No. (4) plug, item No. (5) plug, item No. (6) plug and item No. (7) threaded bolt.

DETAILED DESCRIPTION OF INVENTION

The floating marine winch handle was invented to minimize the excessive financial loss incurred when replacement of conventional steel non-floating winch handles become necessary. Most sailing yachts carry from four to eight of these winch handles on board and they are easily dropped overboard and quickly sink to the oceans depths. The conventional winch handles of the prior art retail at a cost of twenty-five to sixty dollars each. Because my winch handle is floatable anyone can retrieve it at will, thereby reducing operating expenses for the yacht owner. The floatable winch handle minimizes the financial loss from being dropped overboard from any marine vessel or marine facility requiring manual winches. Its basic use is for the raising of heavy cloth sails and is used in conjunction with manual winches incorporated on sailing vessels, but it can also be used on sea platforms and at dockside to facilitate the loading and unloading of heavy supplies.

The floating marine winch handle is designed at basic right angles, ninety degrees apart; the grip 2 and socket head 3 being perpendicular to the body 1. The winch handle consists of a design that is of basic right angles; ninety degrees from one-another; the body 1, grip 2, and socket head being square and perpendicular to each other. The body 1, socket head 3 and grip 2 are off-set, that is square and perpendicular to one-another. The invention is comprised of a square socket head 3 that accommodates most manual winch female socket configurations; a round hollow tubular body 1 and a round hollow tubular grip 2 which is attached by a threaded bolt 7. The grip 2 is rotatable and allowed to swivel so that minimum labor is applied when in use. The threaded bolt 7 is inserted through a diameter at the end of the body 1 and threaded tightly into the grip 2 allowing the grip 2 to rotate freely. As mentioned above its basic use is for the raising of large cloth sails; i.e. genoas, mains and spinikers when used in conjunction with manual sailboat winches. Assorted plugs 4,5 and 6 are bonded into each end of the body 1 and grip 2 to create a hollowed tubular design that renders a total of ten cubic inches of air space; a displacement factor of ten cubic inches which gives the invention its bouyancy thereby resulting in a weight displacement that renders the winch handle floatable. This floatability is the basic novelty of the invention.

The materials used for construction consist of plastic laminate tubing, solid plastic laminate rod and plastic laminate sheet or any equivalent material. The body 1 is a 1.000 inch diameter tube with an 0.062 wall cut to 8.000 inches in length. The grip 2 is a 1.500 inch diameter tube with an 0.062 wall cut to 5.000 inches in length. The socket head 3 is a 0.675 square by 2.000 inches long and made from solid laminate sheet stock. Assorted plastic laminate plugs 4, 5, and 6 are chemically bonded into the ends of the hollowed tubes, body 1 and grip 2 to create a sealed air space which gives the winch handle its bouyancy. This sealed air space has a total volumn of displacement of ten cubic inches which is implied by the units overall dimensioning. A threaded bolt 7 is used to connect the grip 2 to the body 1. The socket head 3 is chemically bonded into the opposite end of the body 1. The best mode of operation used in constructing this item is a table saw, a drill press and a hand tapping tool. The tubing for the body 1 and grip 2 is purchased at a standard size and is then sawed to the dimensional lengths required. The socket head 3 stock is also standard size and sawed on a table saw to length and width required. The plastic laminate plugs 4, 5, and 6, are also purchased as standard size rod stock and sawed to the proper lengths. After bonding, the body 1 and grip 2 is drilled with the use of a drill press to accommodate the threaded bolt 7. The grip 2 is then hand tapped to the proper thread size so that it can be fastened permanently to the body 1. The diameter drilled through the end of the body 1 allows the shank of the threaded bolt 7 to rotate freely with the grip 2 assembled to the body 1.

I claim:

1. A hollow laminated plastic three piece winch handle consisting of a hollowed tubular body, a hollowed tubular grip and a solid socket head; the socket head and body being bonded together; the grip being connected to the body by a stainless steel bolt and allowed to rotate freely; the design of the winch handle being at basic right angles ninety degrees apart, the body, head and grip being offset and perpendicular to one another; solid laminated plastic plugs being bonded into the ends of the hollowed tubes of the body and grip to create sealed air spaces; wherein the improvement comprises a winch handle that is bouyant; this bouyancy rendering the winch retrievable when dropped into deep water in that the design utilizes a thin tubular wall design that displaces its weight in water causing the winch handle to float; and the thin walled tubular handle to float; and the thin walled tubular design giving the winch handle maximum strength when used in conjunction with sailboat winches.

* * * * *

UNITED STATES PATENT AND TRADEMARK OFFICE

CERTIFICATE OF CORRECTION

PATENT NO. : 4,338,827

DATED : July 13, 1982

INVENTOR(S) : Rachael Hooker

It is certified that error appears in the above-identified patent and that said Letters Patent is hereby corrected as shown below:

Column 2, line 61, after "winch" insert -- handle --.

Signed and Sealed this

*Fifteenth* Day of *March 1983*

[SEAL]

*Attest:*

GERALD J. MOSSINGHOFF

*Attesting Officer* *Commissioner of Patents and Trademarks*